United States Patent [19]

Sudarshan et al.

[11] Patent Number: 5,331,460
[45] Date of Patent: Jul. 19, 1994

[54] OPTICAL ROTATION DEVICE

[76] Inventors: E. C. George Sudarshan, 5506-B Montview St., Austin, Tex. 78756; Randall G. Hulet, 1917 Dunstan Rd., Houston, Tex. 77005

[21] Appl. No.: 65,785

[22] Filed: May 3, 1993

Related U.S. Application Data

[63] Continuation of Ser. No. 772,105, Oct. 7, 1991, abandoned.

[51] Int. Cl.$^5$ .......................... G02B 3/06; G02B 27/22
[52] U.S. Cl. ...................... 359/434; 359/503; 359/710; 359/744
[58] Field of Search ............... 359/434, 435, 503, 710, 359/744

[56] References Cited

U.S. PATENT DOCUMENTS

| | | |
|---|---|---|
| 879,572 | 2/1908 | Neumayer . |
| 1,553,211 | 9/1925 | Barr et al. . |
| 1,829,634 | 10/1931 | Chretien . |
| 1,938,808 | 12/1933 | Ceccarini . |
| 1,962,892 | 6/1934 | Chretien . |
| 1,971,457 | 8/1934 | Maurer . |
| 2,121,567 | 6/1938 | Newcomer . |
| 2,164,827 | 7/1939 | Levim . |
| 2,303,113 | 11/1942 | Eckel . |
| 2,720,813 | 10/1955 | Cox . |
| 2,822,727 | 2/1958 | Raitiere . |
| 2,832,262 | 4/1958 | Cook . |
| 2,924,145 | 2/1960 | Landeau . |
| 2,944,464 | 7/1960 | Rosen . |
| 3,359,056 | 12/1967 | Offner . |
| 3,380,335 | 4/1968 | Clave et al. . |
| 3,472,578 | 10/1969 | Price . |
| 3,485,554 | 12/1969 | Hemstreet . |
| 3,759,590 | 9/1973 | Arnaud .............................. 359/434 |
| 3,800,085 | 3/1974 | Ambats et al. . |
| 4,043,641 | 8/1977 | Gottlieb . |
| 4,203,652 | 5/1988 | Hanada . |

FOREIGN PATENT DOCUMENTS

| | | | |
|---|---|---|---|
| 2409706 | 9/1974 | Fed. Rep. of Germany ...... | 359/434 |
| 2409708 | 9/1974 | France ................................ | 359/434 |

OTHER PUBLICATIONS

E. C. G. Sudarshan Realization of First Order Optical Systems using Thin Lenses, *Optica Acta*, vol. 32, No. 8.
D. W. Swift Image Rotation Devices-A Comparative Survey *Optics & Laser Tech.*

Primary Examiner—Jon W. Henry

[57] ABSTRACT

An optical rotation device with infinite depth of field for transmitting optical images along an optical axis and selectively rotating the image about the optical axis, while preserving all of the three dimensional characteristics of the image. The optical rotation device consists of two optical elements optically coupled in series, each of which produces an inversion of the image about an axis orthogonal to the optical axis. Rotation of the image by any angle in the plane normal to the optical axis is achieved by rotating the two optical elements relative to one another about the optical axis.

10 Claims, 1 Drawing Sheet

OPTICAL ROTATION DEVICE

This application is a continuation of U.S. application Ser. No. 07/772,105, filed Oct. 7, 1991, for OPTICAL ROTATION DEVICE, now abandoned.

BACKGROUND OF THE INVENTION

1. Field of the Invention

This invention relates to the translation and rotation of optical images. More particularly, the invention relates to an image rotation device with infinite depth of field that transmits optical images along an optical axis, selectively rotates the images about the optical axis, and preserves all of the three dimensional characteristics of the images.

2. Description of the Prior Art

Various methods have been employed to rotate images. Most rotation devices disclosed in the prior art utilize prisms or other reflective surfaces to effect the rotation. The primary disadvantage of all prior image rotating devices is that they do not preserve the angular and spatial relationships of all light rays emanating from the object being imaged. Such devices do not preserve all of the three dimensional characteristics of the original object, namely the relative angles of propagation and distances of all rays forming the image. Thus, the need exists for an apparatus that is capable of translating accurate three dimensional images to a distance removed from the object being viewed, capable of preserving the relative angles of propagation and distances of all of the rays forming the image, and capable of selectively modifying the orientation of the image for ease of viewing and observation. What is also needed is an optical rotation device for communication and computing applications that preserves the angular and spatial relationships of all light rays passing therethrough.

SUMMARY OF THE INVENTION

It is therefore an object of the present invention to provide an optical system for producing accurate three dimensional images at a distance removed from the object being observed.

Another object of the present invention is to provide an optical system for producing accurate three dimensional images that can be selectively rotated for ease of viewing and observation.

Yet another object of the present invention is to provide an optical system that produces accurate three dimensional images and which preserves the relative angles of propagation and distances of all rays forming the images.

It is also an object of the invention to provide an optical rotation device for communications and computing applications that preserves the angular and spatial relationships of all light rays passing therethrough.

A further object of the invention is to provide an optical rotation device with infinite depth of field.

According to the present invention, there is provided an optical rotation device for transmitting optical images along an optical axis and selectively rotating the image about the optical axis, while preserving all of the three dimensional characteristics of the image. The optical rotation device consists of two optical elements optically coupled in series, each of which produces an inversion of the image about an axis orthogonal to the optical axis. Rotation of the image by any angle in the plane normal to the optical axis is achieved by rotating the two optical elements relative to one another about the optical axis.

The above objects and other features of the present invention will become fully apparent from the following detailed description of the preferred embodiment in conjunction with the drawing.

DESCRIPTION OF THE PREFERRED EMBODIMENT

Reference is now made to the figures, wherein like parts are designated with like numerals throughout.

Figure 1:
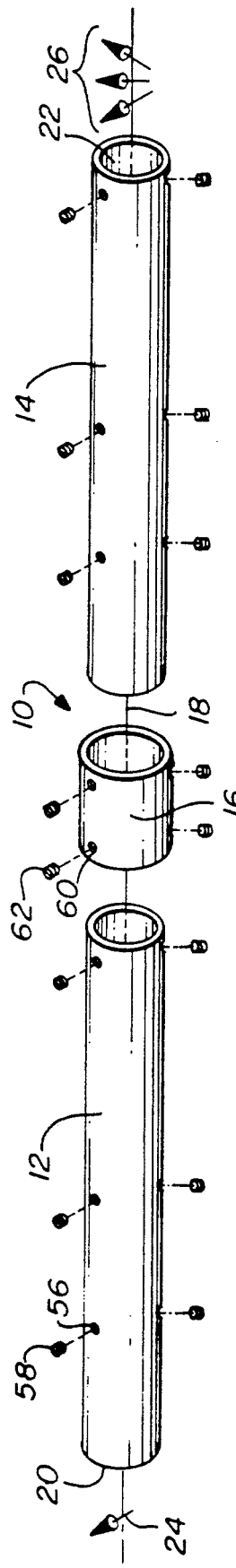
FIG. 1 is a perspective, partially exploded view of the image rotation device of the present invention.

Referring the FIG. 1, the image rotation device 10 consists of a first optical element 12, a second optical element 14 and a collar 16. As discussed in more detail below, collar 16 is used to optically couple first optical element 12 and second optical element 14 in series. When so coupled, first and second optical elements 12 and 14 share a common optical axis 18 (sometimes also referred to as the propagation axis). In addition, collar 16 is configured so as to permit first and second optical elements 12 and 14 to be selectively rotated relative to one another about optical axis 18. Device 10 also has an input end 20 and an output end 22.

As more fully discussed below, when an object 24 is placed adjacent to input end 20, device 10 translates an accurate, three dimensional image 26 of object 24 to output end 22. The image 26 viewed through output end 22 is a three dimensional image and is identical in all respects to the image of object 24 introduced at input end 20. Furthermore, image 26 can be selectively rotated about optical axis 18 by rotating first and second optical elements 12 and 14 relative to one another.

Figure 2:
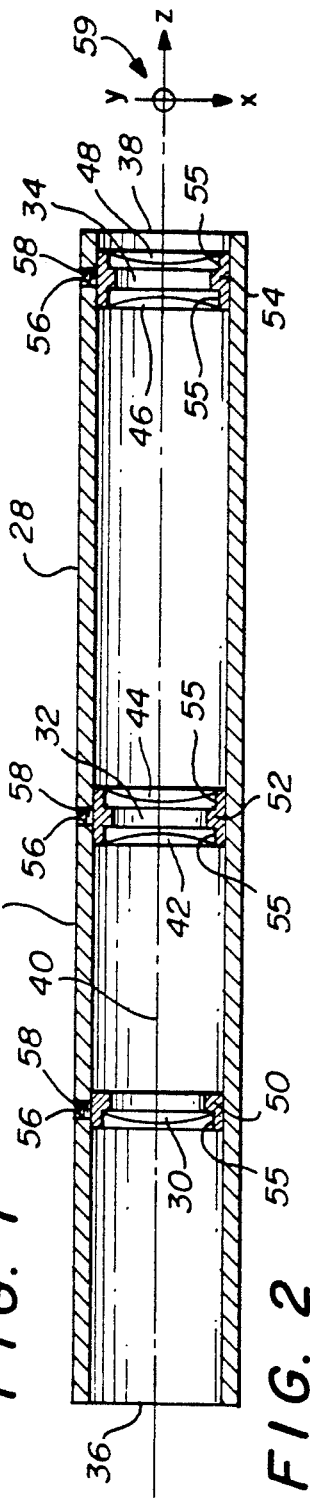
FIG. 2 is a cross sectional view of the image rotation device of the present invention.

FIG. 2 shows a cross sectional view of first optical element 12. The construction and design of second optical element 14 is identical to first optical element 12. Only the construction and design of first optical element 12 will be described in detail below., it being understood that the components of second optical element 14 are identical in all respects to the corresponding parts of first optical element 12.

First optical element 12 is made up of an elongated cylindrical tube 28, a first cylindrical lens 30, a first doublet 32 and a second doublet 34. Tube 28 measures 4D in length. Tube 28 has an input end 36 and an output end 38. Tube 28 could be made out of any suitable non-transparent material, but in the preferred embodiment, tube 28 is made of black anodized aluminum, and has inside and outside diameters equal to 1 1/16 inches and 1 5/16 inches, respectively.

First cylindrical lens 30 is disposed and rigidly mounted within tube 28 a distance D from input end 36. First cylindrical lens 30 is a plano-convex cylindrical lens with a focal length equal to D/4 and is oriented perpendicular to the optical axis 40 (also referred to as the propagation axis) of tube 28 with its convex surface facing input end 36 and its planar surface facing output end 38. First doublet 32 consists of a second cylindrical lens 42 and a first spherical lens 44, which are disposed and rigidly mounted within tube 28 a distance 2D from input end 36. Second Cylindrical lens 42 is a plano-convex cylindrical lens with a focal length equal to D and is oriented perpendicular to longitudinal axis 40 of tube 28 with its planar surface facing input end 36 and its convex surface facing output end 38. First spherical lens 44 is a plano-convex spherical lens with a focal length equal to D and is oriented perpendicular to longitudinal axis 40 of tube 28 with its convex surface facing input end 36 and its planar surface facing output end 38.

Second doublet 34 consists of a third cylindrical lens 46 and a second spherical lens 48, which are disposed and rigidly mounted within tube 28 at output end 38 or a distance 4D from input end 36. Third cylindrical lens 46 is a plano-convex cylindrical lens with a focal length equal to D and is oriented perpendicular to longitudinal axis 40 of tube 28, with its planar surface facing input end 36 and its convex surface facing output end 38. Second spherical lens 48 is a plano-convex spherical lens with a focal length equal to D and is oriented perpendicular to longitudinal axis 40 of tube 28, with its spherical surface facing input end 36 and its planar surface facing output end 38. Lenses 30, 42 and 46 are further oriented such that their cylindrical axes are all parallel and all orthogonal to optical axis 40.

In the preferred embodiment, D is equal to eight inches. Hence, lens 30 has a focal length equal to two inches; lenses 42, 44, 46 and 48 each have focal lengths equal to eight inches; lens 30 is located a distance of eight inches from input end 36; first doublet 32 is located a distance of 16 inches from input end 36; and second doublet 34 is located a distance of 32 inches from input end 36. It should be noted, however, that the specific dimensions given herein are illustrative only, and that changes in the specific dimensions of optical rotation device 10 may be made without departing from the essential characteristics of the invention. In the preferred embodiment, lenses 30, 42, 44, 46 and 48 are also coated with conventional antireflectant material to reduce reflections and attenuation.

Lenses 30, 42, 44, 46 and 48 can be rigidly mounted within tube 28 using any conventional method. In the preferred embodiment, lens holders 50, 52 and 54 are employed. Lenses 30, 42, 44, 46 and 48, which are all one inch in diameter, are cemented at their periphery to their corresponding lens holders, and lens holders 50, 52 and 54 are configured so as to slide into tube 28 with close tolerance. Lens holders 50, 52 and 54 also have annular recesses 55 which receive the edges of lenses 30, 42, 44, 46 and 48 in close tolerance. Tube 28 includes three sets of threaded holes 56, each set radially spaced at 120 degree increments, which receive set screws 58 for securing lens holders 50, 52 and 54 at the appropriate locations within tube 28.

Referring again to FIG. 1, collar 16 is used to optically couple the output end of first optical element 12 to the input end of second optical element 14, although any number of conventional means could be used to couple first and second optical elements 12 and 14 together. In the preferred embodiment, collar 16 is an elongated tube measuring 5 inches in length and having inside and outside diameters equal to 1 5/16 inches and 1 9/16 inches, respectively. Collar 16, which is made of black anodized aluminum, is configured to accept the output end of first optical element 12 and the input end of second optical element 14 in mating relationship. Collar 16 has two sets of threaded holes 60 radially spaced at 120 degree increments, which accept set screws 62 for securing collar 16 to first and second optical elements 12 and 14. By loosening set screws 62, first and second optical elements 12 and 14 can be selectively rotated about optical axis 40 relative to one another.

First and second optical elements 12 and 14 are each formed by combining two fundamental components—an inverter and a translator, each of unit magnification. The optical properties of first and second optical elements 12 and 14 can best be understood by first considering the optical properties of the individual components separately and then in combination.

Figure 3:
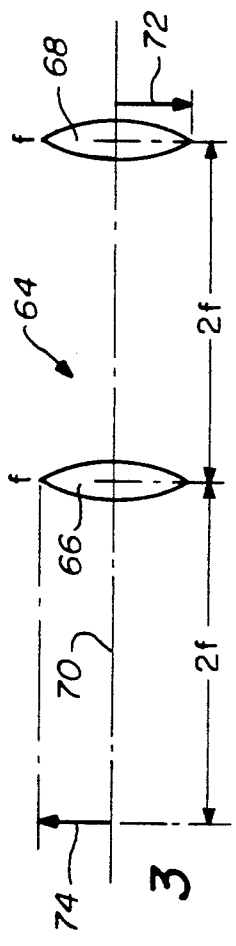
FIG. 3 is a schematic illustration of an inverter.

FIG. 3 illustrates, in schematic fashion, an afocal inverter 64 of unit magnification. Inverter 64 consists of two thin lenses 66 and 68, each having a positive focal length equal to f. Lenses 66 and 68, which share a common optical axis 70, are spaced apart a distance equal to 2f, thereby forming a pair of infinite conjugates of unit magnification.

The characteristics of any optical device can be mathematically expressed in terms of a transfer matrix. See generally E. Hecht, *Optics* at 215–220 (1987). The use of transfer matrices is an analytic method of geometric ray tracing, using the linear (paraxial) approximation. In one dimension, a ray is expressed as a vector whose components are the angle the ray makes with the optical axis and the perpendicular distance of the ray from the axis. A system consisting of thin lenses and free propagation lengths can be expressed as the product of the refraction matrices and transfer matrices associated with the lenses making up the system. The characteristics of inverter 64 can be expressed as follows:

$$\begin{bmatrix} 1 & 0 \\ 2f & 1 \end{bmatrix} \begin{bmatrix} 1 & -1/f \\ 0 & 1 \end{bmatrix} \begin{bmatrix} 1 & 0 \\ 2f & 1 \end{bmatrix} \begin{bmatrix} 1 & -1/f \\ 0 & 1 \end{bmatrix} = -\begin{bmatrix} 1 & 0 \\ 0 & 1 \end{bmatrix}$$

Thus, inverter 64 translates an inverted image 72 of an object 74 by a distance equal to 4f. Inverter 64 has the unique property that it preserves the relative angles of propagation and positions of all rays passing therethrough, thereby producing an accurate, three dimensional image of objects viewed through inverter 64.

Figure 4:
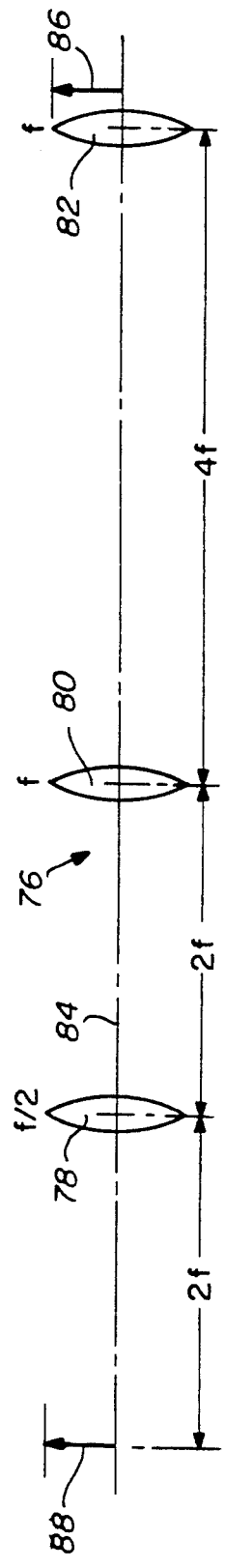
FIG. 4 is a schematic illustration of an optical translator.

FIG. 4 illustrates, in schematic fashion, an afocal translator 76 of unit magnification. Translator 76 consists of three thin lenses 78, 80 and 82. Lens 78 has a positive focal length equal to f/2, and lenses 80 and 82 each have positive focal lengths equal to f. Lenses 78, 80 and 82 share a common optical axis 84. The distance between lenses 78 and 80 is equal to 2f, and the distance between lenses 80 and 82 is equal to 4f. The characteristics of translator 76 can be expressed as follows:

$$\begin{bmatrix} 1 & 0 \\ 2f & 1 \end{bmatrix} \begin{bmatrix} 1 & -2/f \\ 0 & 1 \end{bmatrix} \begin{bmatrix} 1 & 0 \\ 2f & 1 \end{bmatrix} \begin{bmatrix} 1 & -2/f \\ 0 & 1 \end{bmatrix} \begin{bmatrix} 1 & 0 \\ 4f & 1 \end{bmatrix} \begin{bmatrix} 1 & -1/f \\ 0 & 1 \end{bmatrix} = \begin{bmatrix} 1 & 0 \\ 0 & 1 \end{bmatrix}$$

Thus, translator 76 translates an image 86 of an object 88 by a distance equal to 8f. Translator 76 also preserves the relative angles of propagation and positions of all rays passing therethrough, thereby producing an accurate, three dimensional image of objects viewed through translator 76.

Referring again to FIG. 2, first and second optical elements 12 and 14 each consist of an inverter in combination with a translator. If x,y and z coordinates are taken for FIG. 2 as illustrated at 59, first optical element 12 is oriented such that the cylindrical axes of lenses 30, 42 and 46 are all parallel to the y axis (e.g., perpendicular to the plane of the drawing). Any light ray passing through optical element 12 along propagation axis 40 will have an x-component and a y-component. Because lenses 30, 42 and 46 are cylindrical lenses with their cylindrical axes parallel to the y-axis, the y-component of any ray passing through first optical element 12 will be unaffected by lenses 30, 42 and 46, while the x-component will be refracted by lenses 30, 42 and 46. A comparison of FIGS. 2 and 4 will reveal that the x-component of any ray will be refracted by three lens systems, which are either simple or compound, and which together form a translator that is equivalent to translator 76. The first lens system acting on the x-component is lens 30 with a focal length equal to D/4. The second lens system is a first doublet 32 consisting of lens 42 and lens 44, each with a focal length equal to D. By simple thin lens relationships, the focal length of the first doublet 32 is D/2. The third lens system is second doublet 34 of focal length D/2, consisting of lenses 46 and 48, each with a focal length D. In the other direction, the y-component of any ray passing through first optical element 12 will be refracted only by lenses 44 and 48, which form an inverter that is equivalent to inverter 65. Thus, first optical element 12 translates a three dimensional image of an object from its input end to its output end, wherein the translated image is reflected about an axis that is normal to the propagation axis 40. In other words, the image is simply translated with respect to the x-axis, but is inverted with respect to the y-axis.

Device 10 is capable of rotating an image by any angle in the plane normal to the propagation axis 18 by performing two inversion operations about different axes. One inversion operation is performed by first optical element 12 about a first axis lying in a first plane normal to propagation axis 18, and the other inversion operation is performed by second optical element 14 about a second axis lying in a second plane normal to propagation axis 18.

To show that rotation of an image can be accomplished through two sequential inversions about different axes, let A represent an operation (e.g., inversion, rotation, etc.) so that:

$$\begin{bmatrix} x' \\ y' \end{bmatrix} = A \begin{bmatrix} x \\ y \end{bmatrix}$$

One operation that can be performed on vector $$\begin{bmatrix} x \\ y \end{bmatrix}$$

is rotation. For rotation in the counter-clockwise direction:

$$A = R = \begin{bmatrix} \cos\theta & \sin\theta \\ -\sin\theta & \cos\theta \end{bmatrix}$$

Another operation that can be performed on vector $$\begin{bmatrix} x \\ y \end{bmatrix}$$

is inversion:

$$A = I = \begin{bmatrix} -1 & 0 \\ 0 & 1 \end{bmatrix}$$

The operation of each of first and second optical elements 12 and 14 in the x-y plane is to reflect about some axis. This operation can be expressed mathematically by first rotating the coordinate system of the first optical element 12 so that it is aligned with the inversion axis, perform the inversion, then rotate back:

$$A_1(\theta) = R_1^{-1} I R_1 = -\begin{bmatrix} \cos^2\theta - \sin^2\theta & 2\cos\theta\sin\theta \\ 2\cos\theta\sin\theta & -\cos^2\theta + \sin^2\theta \end{bmatrix}$$

Where $\Theta$ is the angle between the coordinate system of first optical element 12 and some fixed coordinate system in space. A similar operator can be derived for second optical element 14 as follows:

$$A_2(\alpha) = R_2^{-1} I R_2 = -\begin{bmatrix} \cos^2\alpha - \sin^2\alpha & 2\cos\alpha\sin\alpha \\ 2\cos\alpha\sin\alpha & -\cos^2\alpha + \sin^2\alpha \end{bmatrix}$$

Where $\alpha$ is the angle between the coordinate system of second optical element 14 and the fixed coordinate system.

Therefore, the operation of the optical rotation device 10 can be expressed as the product of the operations of first and second optical elements 12 and 14:

$$C(\Theta, \alpha) = A_2(\alpha) A_1(\Theta)$$

After multiplying and simplifying the matrices, the result is found to depend only on the difference angle $\phi = \Theta - \alpha$:

$$C(\theta, \alpha) = c(\Phi) = \begin{bmatrix} \cos 2\Phi & \sin 2\Phi \\ -\sin 2\Phi & \cos 2\Phi \end{bmatrix}$$

which is simply the rotation matrix. Thus, two inversions about axes that are related by an angle $\Phi$ with respect to each other produces a rotation in the x-y plane by an angle $2\Phi$.

Thus, by selectively rotating first and second optical elements 12 and 14 relative to one another, it is possible to vary the orientation of the axes about which the respective inversion operations are performed. Therefore, physically rotating first and second optical elements 12 and 14 relative to one anther produces a rotation of image 26 as viewed from output end 22. Thus, device 10 produces accurate, three dimensional images of objects viewed therethrough, translates those images from input end 20 to output end 22 a distance equal to 32 inches and enables the images to be reoriented for convenience of viewing and observation. Moreover, device 10 preserves all of the three dimensional characteristics of the image, namely the relative angles of propagation and distances of all rays forming the image.

Another important property of optical rotation device 10 is that it possesses infinite depth of field. This property is a direct result of the fact that optical rotation device 10 preserves the relative angles and directions of all rays within the solid angle subtended by input end 20. In other words, all rays exiting output end 22 bear precisely the same angular and spatial relationship to one another as they did when they entered input end 20. Accordingly, optical rotation device 10 has no focal plane and, therefore, possesses infinite depth of field.

While the foregoing discussion has concentrated on the use of optical rotation device 10 for three dimensional imaging applications, device 10 may also be used in any other application requiring translation and/or rotation of light rays where the preservation of the angular and spatial relationship between the various light rays is important. For example, device 10 could be used in optical communication networks to transmit and selectively rotate the orientation of one or more beams of light. Similarly, device 10 could be used in other optical applications such as optical computing and the like. Regardless of the applications, the principles and characteristics of device 10 discussed herein would hold true.

The invention may be embodied in other specific forms without departing from the spirit or essential characteristics. The described embodiment is to be considered in all respects only as illustrative and not restrictive, and the scope of the invention is, therefore, indicated by the appended claims rather than the foregoing description. All changes that come within the meaning and range of equivalency of the claims are embraced within their scope.

We claim:

1. An afocal image rotation device for translating a three dimensional image of an object along, and selectively rotating the image about, an optical axis comprising:
    means for inverting the image about a first axis normal to the optical axis;
    means for inverting the image about a second axis normal to the optical axis;
    means for optically coupling the first inverting means and the second inverting means in series along the optical axis; and
    means for selectively rotating the first and second inverting means relative to one another about the optical axis,
wherein all rays exiting the device bear precisely the same angular and spatial relationship to one another as they did as they entered the device.

2. The image rotation device of claim 1 wherein said first and second inverting means each comprise:
    an elongated optical element having an input end, an output end, and a longitudinal dimension equal to 4D, comprising:
        a first cylindrical lens with a focal length equal to D/4, located a distance D from the input end, and oriented such that its planar surface is perpendicular to the optical axis and its cylindrical axis is parallel to a first axis orthogonal to the optical axis;
        a first doublet, located a distance a distance 2D from the input end, comprising:
            a second cylindrical lens with a focal length equal to D and oriented such that its planar surface is perpendicular to the optical axis and its cylindrical axis is parallel to the first axis; and
            a first spherical lens with a focal length equal to D and oriented perpendicular to the optical axis; and
        a second doublet, located a distance a distance 4D from the input end, comprising:
            a third cylindrical lens with a focal length equal to D and oriented such that its planar surface is perpendicular to the optical axis and its cylindrical axis is parallel to the first axis; and
            a second spherical lens with a focal length equal to D and oriented perpendicular to the optical axis.

3. An afocal image rotation device for translating a three dimensional image of an object along, and selectively rotating the image about, an optical axis comprising:
    means for inverting the image in a first direction in a first plane normal to the optical axis and translating the image, without inversion, in a second direction in said first plane;
    means for inverting the image in a first direction in a second plane normal to the optical axis and translating the image, without inversion, in a second direction in said second plane;
    means for optically coupling the first inverting and translating means and the second inverting and translating means in series along the optical axis; and
    means for selectively rotating the first and second inverting and translating means relative to one another about the optical axis,
wherein all rays exiting the device bear precisely the same angular and spatial relationship to one another as they did as they entered the device.

4. An afocal image rotation device for translating a three dimensional image of an object along, and selectively rotating the image about, an optical axis, comprising:
    a first elongated optical element having an input end, an output end, and a longitudinal dimension equal to 4D, comprising:
        a first cylindrical lens with a focal length equal to D/4, located a distance D from the input end, and oriented such that its planar surface is perpendicular to the optical axis and its axis is parallel to a first axis orthogonal to the optical axis;
        a first doublet, located a distance 2D from the input end, comprising:
            a second cylindrical lens with a focal length equal to D and oriented such that its planar surface is perpendicular to the optical axis and its axis is parallel to the first axis; and
            a first spherical lens with a focal length equal to D and oriented perpendicular to the optical axis; and
        a second doublet, located a distance 4D from the input end, comprising:
            a third cylindrical lens with a focal length equal to D and oriented such that its planar surface is perpendicular to the optical axis and its axis is parallel to the first axis; and a second spherical lens with a focal length equal to D and oriented perpendicular to the optical axis; and a second elongated optical element having an input end, an output end, and a longitudinal dimension equal to 4D, comprising:
  a first cylindrical lens with a focal length equal to D/4, located a distance D from the input end, and oriented such that its planar surface is perpendicular to the optical axis and its axis is parallel to a first axis orthogonal to the optical axis;
  a first doublet, located a distance 2D from the input end, comprising:
    a second cylindrical lens with a focal length equal to D and oriented such that its planar surface is perpendicular to the optical axis and its axis is parallel to the first axis; and
    a first spherical lens with a focal length equal to D and oriented perpendicular to the optical axis; and
  a second doublet, located a distance 4D from the input end, comprising:
    a third cylindrical lens with a focal length equal to D and oriented such that its planar surface is perpendicular to the optical axis and its axis is parallel to the first axis; and
    a second spherical lens with a focal length equal to D and oriented perpendicular to the optical axis;

the output end of the first optical element being optically coupled to the input end of the second optical element in such a manner as to allow the first and second optical elements to be selectively rotated about the optical axis relative to one another, wherein all rays exiting the device bear precisely the same angular and spatial relationship to one another as they did as they entered the device.

5. An afocal image rotation device for translating a three dimensional image along, and selectively rotating the image about, an optical axis, comprising:
  a first optical element, comprising:
    an elongated cylindrical tube 32" in length, having an outside diameter equal to 1 5/16" and an inside diameter equal to 1 1/16" and having an input end and an output end;
    a first cylindrical lens with a focal length equal to 2", rigidly mounted within the tube at a distance of 8" from the input end, and oriented such that its planar surface is perpendicular to the optical axis and its axis is parallel to a first axis orthogonal to the optical axis;
    a first doublet, rigidly mounted within the tube at a distance of 16" from the input end, comprising:
      a second cylindrical lens with a focal length equal to 8" and oriented such that its planar surface is perpendicular to the optical axis and its axis is parallel to the first axis; and
      a first spherical lens with a focal length equal to 8" and oriented perpendicular to the optical axis; and
    a second doublet, rigidly mounted within the tube at a distance of 32" from the input end, comprising:
      a third cylindrical lens with a focal length equal to 8" and oriented such that its planar surface is perpendicular to the optical axis and its axis is parallel to the first axis; and
      a second spherical lens with a focal length equal to 8" and oriented perpendicular to the optical axis; and
  a second optical element, comprising:
    an elongated cylindrical tube 32" in length, having an outside diameter equal to 1 5/16" and an inside diameter equal to 1 1/16" and having an input end and an output end;
    a first cylindrical lens with a focal length equal to 2", rigidly mounted within the tube at a distance of 8" from the input end, and oriented such that its planar surface is perpendicular to the optical axis and its axis is parallel to a first axis orthogonal to the optical axis;
    a first doublet, rigidly mounted within the tube at a distance of 16" from the input end, comprising:
      a second cylindrical lens with a focal length equal to 8" and oriented such that its planar surface is perpendicular to the optical axis and its axis is parallel to the first axis; and
      a first spherical lens with a focal length equal to 8" and oriented perpendicular to the optical axis; and
    a second doublet, rigidly mounted within the tube at a distance of 32" from the input end, comprising:
      a third cylindrical lens with a focal length equal to 8" and oriented such that its planar surface is perpendicular to the optical axis and its axis is parallel to the first axis; and
      a second spherical lens with a focal length equal to 8" and oriented perpendicular to the optical axis; and
  means for optically coupling the output end of the first optical element to the input end of the second optical element in such a manner as to allow the first and second optical elements to be selectively rotated about the optical axis relative to one another, wherein all rays existing the device bear precisely the same angular and spatial relationship to one another as they did as they entered the device.

6. The image rotation device of claim 1 wherein each of said first and said second inverting means comprise one or more refractive lenses.

7. The image rotation device of claim 1 wherein each of said first and said second inverting means are anamorphic.

8. The image rotation device of claim 1 wherein each of said first and said second inverting means are anamorphic and comprise one or more refractive lenses.

9. An afocal image rotation device of unit magnification for translating a three dimensional image of an object along, and selectively rotating the image about, an optical axis comprising:
  first refractive means for inverting an image about a first axis normal to the optical axis;
  second refractive means for inverting the image about a second axis normal to the optical axis;
  means for optically coupling the first refractive means and the second refractive means in series along the optical axis; and
  means for selectively rotating the first and second refractive means relative to one another about the optical axis, wherein all rays exiting the device bear precisely the same angular and spatial relationship to one another as they did as they entered the device.

10. The afocal image rotation device of claim 9 wherein each of the first and second refractive means are anamorphic.

* * * * *